US011531748B2

(12) United States Patent
Zhan et al.

(10) Patent No.: US 11,531,748 B2
(45) Date of Patent: Dec. 20, 2022

(54) METHOD AND SYSTEM FOR AUTONOMOUS MALWARE ANALYSIS

(71) Applicants: Beijing Jingdong Shangke Information Technology Co., Ltd., Beijing (CN); JD.com American Technologies Corporation, Mountain View, CA (US)

(72) Inventors: Zhenxin Zhan, Fremont, CA (US); Junyuan Zeng, Mountain View, CA (US); Jimmy Su, Mountain View, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 1015 days.

(21) Appl. No.: 16/246,445

(22) Filed: Jan. 11, 2019

(65) Prior Publication Data

US 2020/0226249 A1 Jul. 16, 2020

(51) Int. Cl.
*G06F 21/53* (2013.01)
*G06F 21/56* (2013.01)
(Continued)

(52) U.S. Cl.
CPC ............... *G06F 21/53* (2013.01); *G06F 9/54* (2013.01); *G06F 21/566* (2013.01); *G06T 7/11* (2017.01);
(Continued)

(58) Field of Classification Search
CPC .......... G06F 21/53; G06F 9/54; G06F 21/566; G06T 7/11; G06T 2207/20021; G06V 30/153; G06V 30/10
(Continued)

(56) References Cited

U.S. PATENT DOCUMENTS 6,323,884 B1 * 11/2001 Bird .................... G06F 3/04812
715/810
9,104,867 B1 8/2015 Thioux et al.
(Continued)

OTHER PUBLICATIONS

Egele, "A Survey on Automated Dynamic Malware-Analysis Techniques and Tools", Feb. 8, 2012, ACM, pp. 1-41 (Year: 2012).*
(Continued)

*Primary Examiner* — Taghi T Arani
*Assistant Examiner* — Gregory A Lane
(74) *Attorney, Agent, or Firm* — Scully, Scott, Murphy & Presser, P.C.

(57) ABSTRACT

A computer-implemented method, a device, and a non-transitory computer-readable storage medium of automatically determining an interactive GUI element in a graphic user interface (GUI) to be interacted. The method includes: detecting, by the processor, one or more candidate interactive GUI elements in the GUI based on a plurality of algorithms; determining, by the processor, a likelihood indicator for each of the one or more candidate interactive GUI elements, a likelihood indicator indicating the likelihood that a candidate interactive GUI element associated with the likelihood indicator is an interactive GUI element to be interacted; and determining, by the processor, an interactive GUI element to be interacted from the one or more candidate interactive GUI elements based on the likelihood indicators.

17 Claims, 8 Drawing Sheets

(51) Int. Cl.
*G06F 9/54* (2006.01)
*G06T 7/11* (2017.01)
*G06V 30/148* (2022.01)
*G06V 30/10* (2022.01)

(52) U.S. Cl.
CPC .. *G06V 30/153* (2022.01); *G06T 2207/20021* (2013.01); *G06V 30/10* (2022.01)

(58) Field of Classification Search
USPC .......................................................... 726/22
See application file for complete search history.

(56) References Cited

U.S. PATENT DOCUMENTS

| | | | | |
|---|---|---|---|---|
| 10,467,029 | B1* | 11/2019 | Lin | ......................... G06F 9/451 |
| 2012/0075440 | A1 | 3/2012 | Ahuja et al. | |
| 2018/0046798 | A1* | 2/2018 | Zeller | ................... G06F 21/552 |
| 2018/0176409 | A1* | 6/2018 | Smith | .................. G06V 30/416 |
| 2018/0268410 | A1* | 9/2018 | Kolotinsky | ............ G06F 21/316 |
| 2021/0150214 | A1* | 5/2021 | Xu | ............................. G06T 3/40 |
| 2021/0333957 | A1* | 10/2021 | Golan | ................. G06F 3/04812 |

OTHER PUBLICATIONS https://en.wikipedia.org/wiki/Sandbox_(computer_security).
https://en.wikipedia.org/wiki/Malware.
https://docs.microsoft.com/en-us/windows/desktop/api/winuser/nf-winuser-enumwindows.
https://docs.microsoft.com/en-us/windows/desktop/api/winuser/nf-winuser-enumchildwindows.
https://docs.microsoft.com/en-us/windows/desktop/controls/window-controls.
https://en.wikipedia.org/wiki/Optical_character_recognition.
https://docs.microsoft.com/en-us/windows/desktop/learnwin32/what-is-a-window-.

* cited by examiner

METHOD AND SYSTEM FOR AUTONOMOUS MALWARE ANALYSIS

CROSS-REFERENCES

Some references, which may include patents, patent applications, and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure is related to the field of automation control, and in particular, to a computer-implemented method, a device, and a non-transitory computer-readable storage medium of automatically determining a user interaction malware.

BACKGROUND

With the increasing popularity of electronic devices such as computers and mobile phones, they have become indispensable parts of our daily life. However, malware has become a threat to such electronic devices.

Malware (a portmanteau for malicious software) is any software intentionally designed to cause damage to a computer, server, client, or computer network. Malware does the damage after it is implanted or introduced in some way into a target's computer or mobile phone and can take the form of executable code, scripts, active content, and other software. The code is described as computer viruses, worms, Trojan horses, ransomware, spyware, adware, or scareware, among other terms. Malware has a malicious intent, acting against the interest of the computer user, and so does not include software that causes unintentional harm due to some deficiency, which is typically described as a software bug.

Studying the behavior of malware can be used to develop anti-malware solutions to prevent malware outbreak. Sandbox technology is often used to execute untrusted programs in a tightly controlled environment without harm the host device [2]. For large-scale malware behavior studying, automation technologies without user interaction are developed to improve productivity in sandbox [3]. However, malware are evolving and involve sophisticated graphic user interface (GUI) before they exhibit malicious behaviors.

Therefore, an unaddressed need exists in the art to address the aforementioned deficiencies and inadequacies.

SUMMARY

The present disclosure provides a computer-implemented method, a device, and a non-transitory computer-readable storage medium of automatically determining an interactive GUI element in a graphic user interface (GUI) to be interacted.

According to an aspect, a computer-implemented method of automatically determining an interactive GUI element in a graphic user interface (GUI) to be interacted is proposed. The method comprises: detecting, by a processor, one or more candidate interactive GUI elements in the GUI based on a plurality of algorithms; determining, by the processor, a likelihood indicator for each of the one or more candidate interactive GUI elements, the likelihood indicator indicating a likelihood that the candidate interactive GUI element associated with the likelihood indicator is an interactive GUI element to be interacted; and determining, by the processor, an interactive GUI element to be interacted from the one or more candidate interactive GUI elements based on the likelihood indicators.

In certain embodiments, the plurality of algorithms comprises at least one of: an Application Programming Interface (API) based algorithm; an Optical Character Recognition (OCR) based algorithm; and an entropy based algorithm.

In certain embodiments, the step of detecting, by the processor, one or more candidate interactive GUI elements in the GUI based on a plurality of algorithms comprises: extracting, by the processor, text from each of one or more interactive GUI elements in the GUI by using an API for the GUI; determining, by the processor, a first algorithm-specific likelihood for each of the one or more interactive GUI elements based on the extracted text; and determining, by the processor, for each interactive GUI element for which the calculated first algorithm-specific likelihood is greater than a first algorithm-specific threshold, the interactive GUI element as a candidate interactive GUI element.

In certain embodiments, the step of determining, by the processor, a first algorithm-specific likelihood for each of the one or more interactive GUI elements based on the extracted text comprises: comparing, by the processor, the extracted text with one or more pieces of text in a predefined set of text; and determining, by the processor, a likelihood corresponding to a piece of text in the predefined set of text as the first algorithm-specific likelihood for the corresponding interactive GUI element, in response to the result of the comparison indicating that the extracted text is matched with the piece of text.

In certain embodiments, the step of determining, by the processor, a likelihood indicator for each of the one or more candidate interactive GUI elements comprises: determining, by the processor, the likelihood indicator by weighting the first algorithm-specific likelihood with a first algorithm-specific weight.

In certain embodiments, the step of detecting, by the processor, one or more candidate interactive GUI elements in the GUI based on a plurality of algorithms comprises: detecting, by the processor, one or more text blocks in the GUI by using the OCR-based algorithm; calculating, by the processor, for each of the one or more text blocks, a density and/or a second algorithm-specific likelihood based on the text in the corresponding text block; and determining, by the processor, for each text block for which the density is greater than a second algorithm-specific threshold and/or the second algorithm-specific likelihood is greater than a first algorithm-specific threshold, an interactive GUI element with which the block is associated as a candidate interactive GUI element.

In certain embodiments, the step of calculating, by the processor, for each of the one or more text blocks, a density based on the text in the corresponding text block comprises: determining, by the processor, the number of targeted words and the number of all words in the text in the corresponding text block; and calculating, by the processor, the density by dividing the number of all words by the number of targeted words.

In certain embodiments, the step of determining, by the processor, a likelihood indicator for each of the one or more candidate interactive GUI elements comprises: determining, by the processor, the likelihood indicator by weighting the second algorithm-specific likelihood with a third algorithm-specific weight.

In certain embodiments, the step of detecting, by the processor, one or more candidate interactive GUI elements in the GUI based on a plurality of algorithms comprises: obtaining, by the processor, a GUI image corresponding to the GUI; segmenting, by the processor, the GUI image into a plurality of blocks; determining, by the processor, an entropy for each of the plurality of blocks by using the entropy based algorithm; and determining, by the processor, for each block for which the entropy is greater than a third algorithm-specific threshold, an interactive GUI element with which the block is associated as a candidate interactive GUI element.

In certain embodiments, the step of determining, by the processor, an entropy for each of the plurality of blocks by using the entropy based algorithm comprises: determining, by the processor, an entropy value for each of the plurality blocks based on intensities and/or edge orientations for pixels in the corresponding block in the GUI image.

In certain embodiments, the step of determining, by the processor, a likelihood indicator for each of the one or more candidate interactive GUI elements comprises: determining, by the processor, the likelihood indicator by weighting the entropy with a third algorithm-specific weight.

In certain embodiments, the step of determining, by the processor, an interactive GUI element to be interacted from the one or more candidate interactive GUI elements based on the likelihood indicators comprises: sorting, by the processor, the one or more candidate interactive GUI elements by their likelihood indicators; and determining, by the processor, candidate interactive GUI element with the highest likelihood indicator as the interactive GUI element to be interacted.

In certain embodiments, the method further comprises: comparing, by the processor, information related to the determined interactive GUI element to be interacted with history information previously stored in a database.

In certain embodiments, the method further comprises: interacting, by the processor, with the determined interactive GUI element to be interacted by simulating a user operation corresponding to the type of the interactive GUI element to be interacted, in response to determining that the information related to the determined interactive GUI element to be interacted being not matched with the history information previously stored in a database.

In certain embodiments, the method further comprises: determining, by the processor, whether the state of the GUI is changed after the interaction; and recording, by the processor, information related to the determined interactive GUI element in a database as history information in response to determining that the state of the GUI is changed after the interaction.

In certain embodiments, the method further comprises: determining, by the processor, another interactive GUI element to be interacted from the one or more candidate interactive GUI elements based on the likelihood indicators, in response to determining that the information related to the determined interactive GUI element to be interacted being matched with the history information previously stored in a database.

In certain embodiments, the information related to the determined interactive GUI element to be interacted comprises at least one of: the identifier of the GUI; the title of the determined interactive GUI element to be interacted; the position of the determined interactive GUI element to be interacted; the size of the determined interactive GUI element to be interacted; and the position where the interaction is to be occurred.

In certain embodiments, the application corresponding to the GUI is executed in a sandbox.

According to another aspect, a device is proposed. The device comprises a processor; a memory storing instructions which, when executed by the processor, cause the processor to: detect one or more candidate interactive GUI elements in the GUI based on a plurality of algorithms; determine a likelihood indicator for each of the one or more candidate interactive GUI elements, a likelihood indicator indicating the likelihood that a candidate interactive GUI element associated with the likelihood indicator is an interactive GUI element to be interacted; and determine an interactive GUI element to be interacted from the one or more candidate interactive GUI elements based on the likelihood indicators.

According to yet another aspect, a non-transitory computer-readable storage medium storing instructions which, when executed by a processor, cause the processor to perform the above method is proposed.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1A:
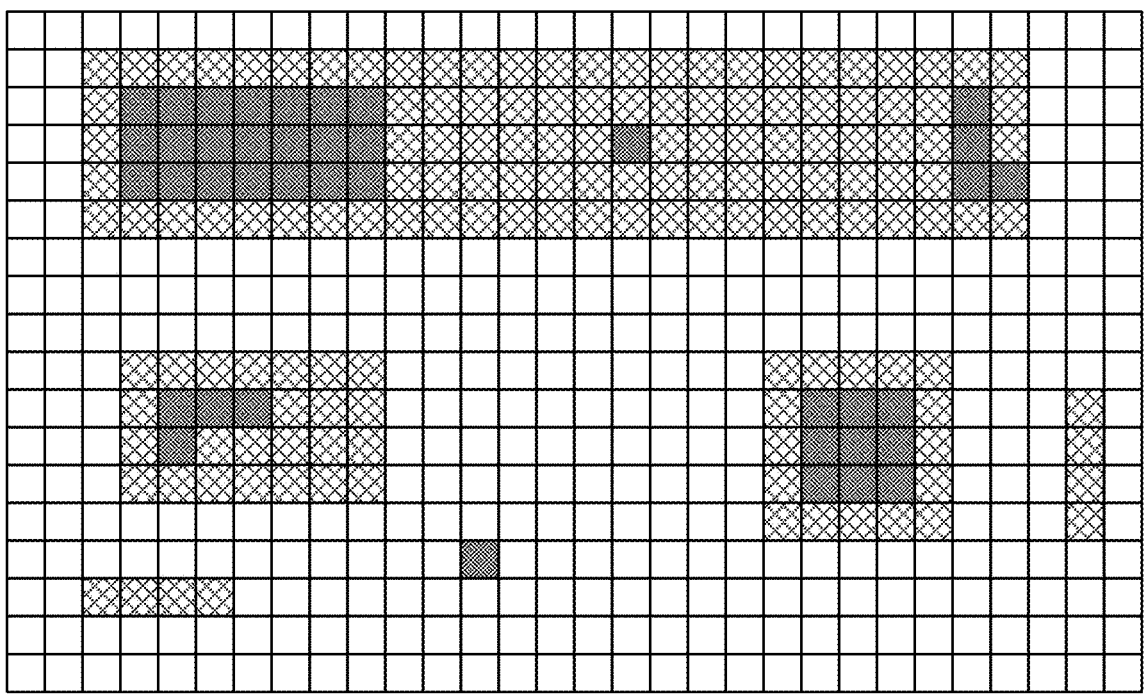
FIG. 1A is a diagram illustrating exemplary resource maps without a sandbox.

The present disclosure is more particularly described in the following examples that are intended as illustrative only since numerous modifications and variations therein will be apparent to those skilled in the art with the teachings of the present disclosure. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially", or "approximately" shall generally mean within 20 percent, within 10 percent, and/or within 5 percent of a given value or range. Numerical quantities given herein are approximate, meaning that the term "around", "about", "substantially", or "approximately" can be inferred if not expressly stated.

As used herein, the term "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" may include memory (shared, dedicated, or group) that stores code executed by the processor.

The term "code", as used herein, may include software, firmware, and/or microcode, and may refer to programs, routines, functions, classes, and/or objects. The term "shared", as used above, means that some or all code from multiple modules may be executed using a single (shared) processor. In addition, some or all code from multiple modules may be stored by a single (shared) memory. The term "group", as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software and may be unidirectional or bidirectional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are sometimes shown as solid line blocks, and virtual software components, which are sometimes shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by the processor. The computer programs include processor-executable instructions that are stored on a non-transitory tangible computer readable storage medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Before a detailed description of some embodiments of the present disclosure is given, some terms used herein will be explained briefly.

Optical Character Recognition (OCR): OCR refers to the mechanical or electronic conversion of images of typed, handwritten, or printed text into machine-encoded text, whether from a scanned document, a photo of a document, a scene-photo (for example, the text on signs and billboards in a landscape photo) or from subtitle text superimposed on an image (for example from a television broadcast). Further, the OCR may also refer to recognizing text from a rasterized image in a general sense.

Goodware: Goodware refers to good software which is not designed to harm computer.

Window: a basic unit of GUI managed by a GUI-enabled Operating System (OS) (e.g. the Microsoft Windows, MacOS, Unix/Linux-based graphic OS) to interact with users.

Control or Interactive GUI element: For Windows, a control is a child window that an application uses in conjunction with other windows to enable user interaction. For other OSs or in general, an interactive GUI element is an UI element provided by a software application for enabling the user to interact with the software application. Therefore, the term "control" and "interactive GUI element" may be used interchangeably herein.

As mentioned above, malicious software or malware is a serious threat to a modern computer or any other computing device. Programs officially supplied by companies can be considered malware if they secretly act against the interests of the computer user. For example, Sony sold the Sony rootkit, which contained a Trojan horse embedded into CDs that silently installed and concealed itself on purchasers' computers with the intention of preventing illicit copying. It also reported on users' listening habits, and unintentionally created vulnerabilities that were then exploited by unrelated malware.

One strategy for protecting against malware is to prevent the malware software from gaining access to the target computer. For this reason, antivirus software, firewalls, and other strategies are used to help protect against the introduction of malware, in addition to checking for the presence of malware and malicious activity and recovering from attacks.

Studying the behavior of malware can be used to develop anti-malware solutions to prevent malware outbreak. For example, one of the developed anti-malware solutions is the Sandbox technology, which is often used to execute untrusted programs in a tightly controlled environment without harming the host device.

In computer security, a sandbox is a security mechanism for physically or logically/virtually separating running programs, usually in an effort to mitigate system failures or software vulnerabilities from spreading. It is often used to execute untested or untrusted programs or code, possibly from unverified or untrusted third parties, suppliers, users, or websites, without risking harm to the host machine or operating system. A sandbox typically provides a tightly controlled set of resources for guest programs to run in, such as scratch space on disk and memory. Network access, the ability to inspect the host system or read from input devices are usually disallowed or heavily restricted.

In the sense of providing a highly controlled environment, sandboxes may be seen as a specific example of virtualization. Sandboxing is frequently used to test unverified programs that may contain a virus or other malicious code, without allowing the software to harm the host device.

Figure 1B:
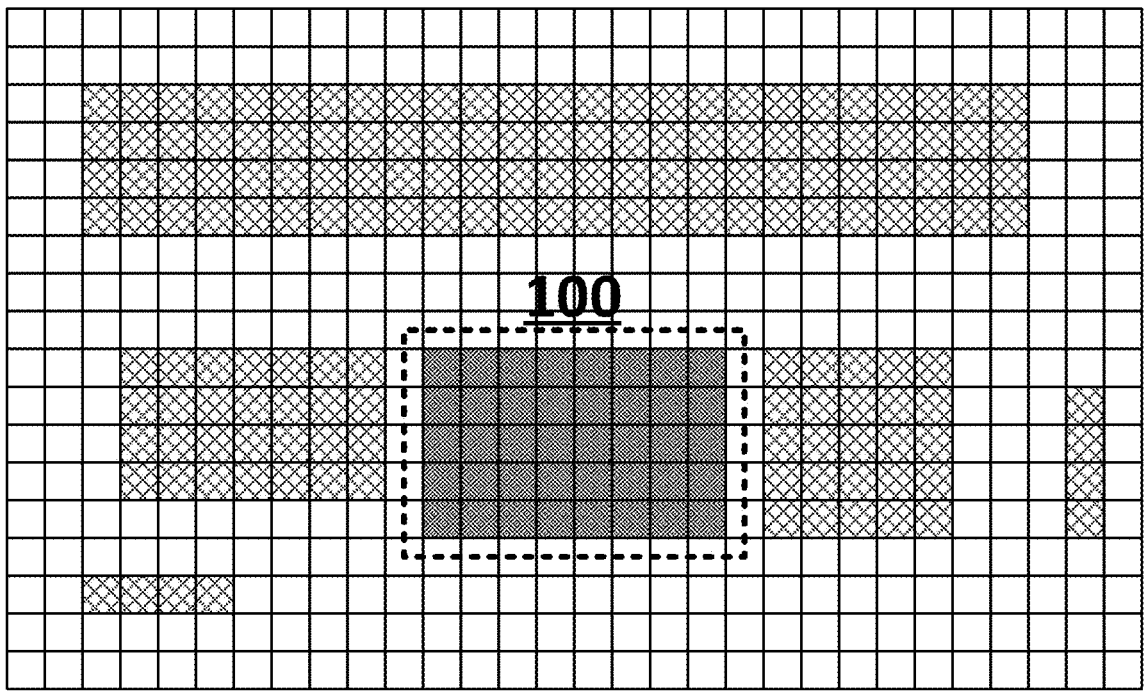
FIG. 1B is a diagram illustrating exemplary resource maps with a sandbox.

FIG. 1A and FIG. 1B are diagrams illustrating exemplary resource maps with and without a sandbox. As shown in FIG. 1A and FIG. 1B, a computer's resources such as storage capacity, network bandwidth, or processor's time slices, shown in a form of resource grid, may be allocated to multiple software applications or processes which are executed on the computer. Without a sandbox, installed malware may read/write data generated/managed by other applications, hack into memory space of other software applications, or excessively occupy valuable processing power and/or network bandwidth, or the like, which may result in a loss of the user of the computer in some sense.

For example, as shown in FIG. 1A, the installed and executed malware (e.g. ransomware) may encrypt data managed by other applications and stored in the storage device of the computer, and then destroy the original data. This leaves the data owner no other choice but to pay the ransom for his/her own data. In contrast, as shown in FIG. 1B, when the malware is installed and executed in a sandbox on the computer, the sandbox may contain the malware within a specified range of resources, for example, a specified storage region 100 allocated to the sandbox. In such a manner, the resources for other applications may be protected and secured.

Therefore, for large-scale malware behavior studying, automation technologies without user interaction are developed typically in a sandbox to improve productivity. However, malware are evolving and involve sophisticated graphic user interface (GUI) before they exhibit malicious behaviors. To drive the malware, an automation technology has to locate a correct trigger or interactive GUI element in a GUI of the malware to drive the malware to show its behaviors.

Figure 2:
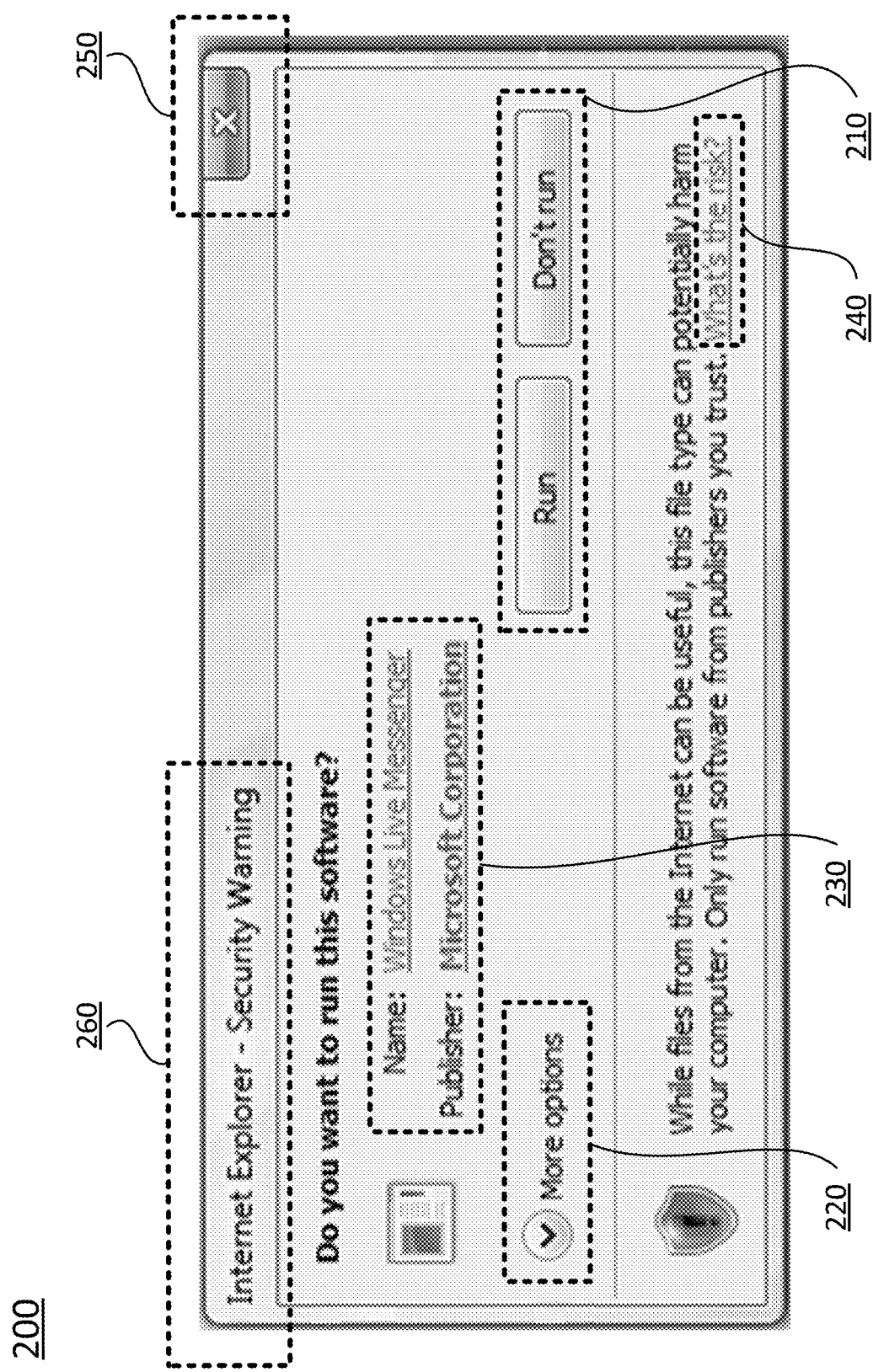
FIG. 2 is a diagram illustrating an exemplary Windows dialog box.

FIG. 2 is a diagram illustrating an exemplary Windows dialog box 200 which is generated by a software application installed and executed in a sandbox. As shown in FIG. 2, the dialog box 200 may comprise one or more GUI elements, for example, buttons 210, a toggle button 220, links 230 & 240, a close button 250, and a dialog title 260. For such a dialog box 200, the automation technology should identify the correct trigger or interactive GUI element to drive the software application to show its behaviors. In the specific embodiment shown in FIG. 2, the correct interactive GUI element is probably the "Run" or "Don't run" button 210.

Current automation solutions rely on the standard API provided by the OS or sandbox (e.g. Windows enumeration API) to enumerate dialog boxes and find the controls which require user interactions (e.g. text inputting, button clicking, or dial rotating). However, such a solution may suffer from following defects:

(1) Standard API may find controls within a dialog box, but cannot determine which control can correctly drive the malware to the next step; and/or (2) Malware often uses obfuscation techniques to bypass automation mechanism in a sandbox, e.g. layered Windows.

Therefore, a solution for locating the correct trigger or interactive GUI element in a GUI is needed. In certain embodiments of the present disclosure, heuristic solutions are designed for the sandbox to click dialog box and drive malware to the next step, such that more behaviors can be observed. Next, a detailed description of such a solution will be given with reference to FIG. 3 in conjunction with FIG. 2.

Figure 3:
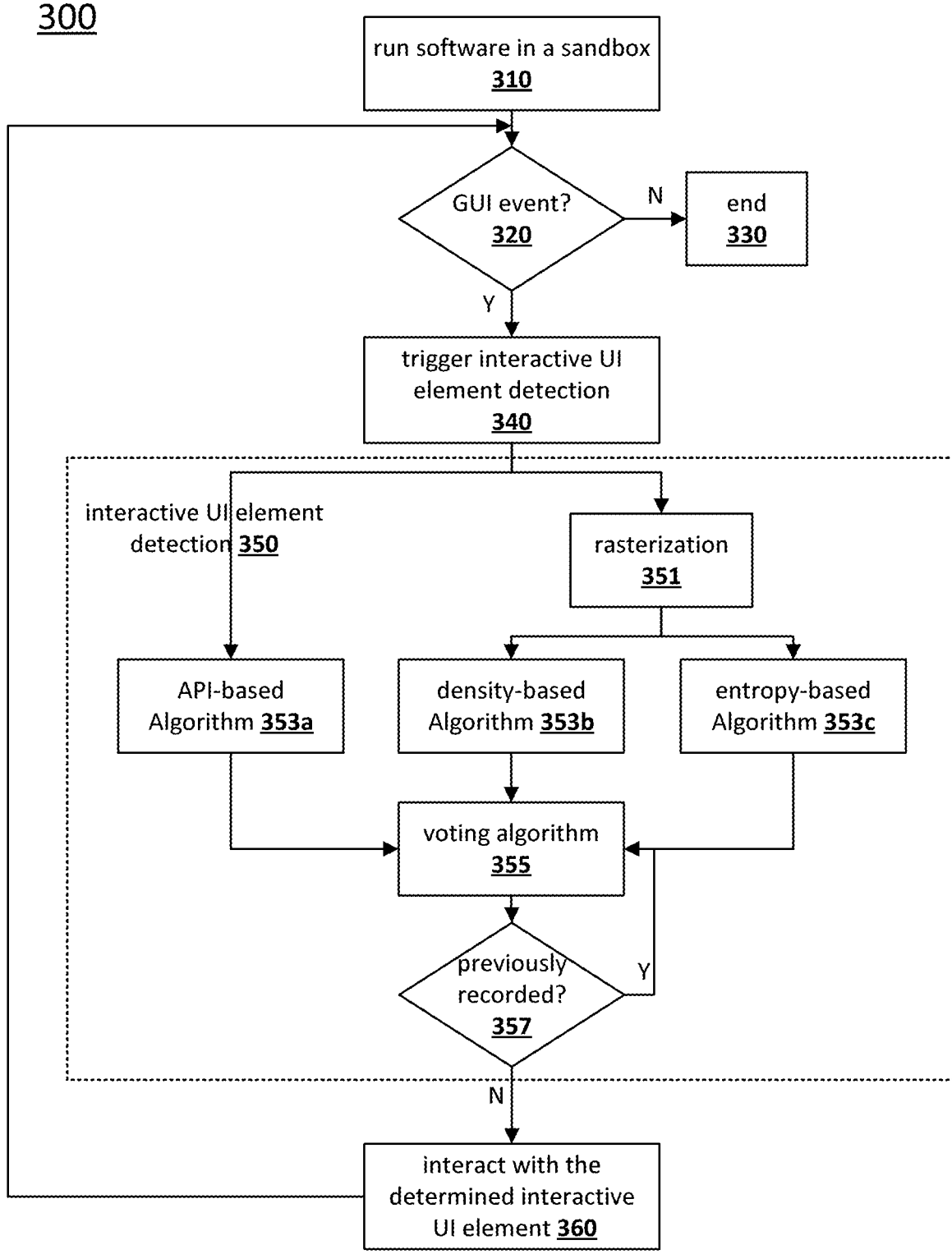
FIG. 3 is a flow chart illustrating an exemplary method of automatically determining an interactive GUI element in a graphic user interface (GUI) to be interacted according to an embodiment of the present disclosure.

FIG. 3 is a flow chart illustrating an exemplary method of automatically determining an interactive GUI element in a graphic user interface (GUI) to be interacted according to an embodiment of the present disclosure.

The method may begin at step 310 where a software application may be executed or run in a sandbox. The sandbox may monitor the execution of the software application and detect any GUI event related to the software application. In certain embodiments, the sandbox may monitor any system function call related to GUI, for example, the MessageBoxIndirectA function for Windows or the like to detect a window create event. If a GUI event is detected at step 320, then the method proceeds to step 340. Otherwise, the method may proceed to step 330 where the method end. In some other embodiments, the method may loop back to step 320 again to detect repeatedly until a GUI event is detected. The repeated detection may be separated from the previous detection by a certain period of time or immediately.

At step 340, if a GUI event is detected, then the method may trigger an interactive GUI element detection procedure 350 shown in FIG. 3 as a dashed box. In general, the interactive GUI element detection procedure may use multiple interactive GUI element detection algorithms to detect candidate interactive GUI elements for selection and choose one of them as the most promising interactive GUI element to be actuated.

For example, as shown in FIG. 3, the interactive GUI element detection procedure 350 may determine candidate interactive GUI elements by using three different algorithms: an API-based algorithm 353a, a density-based algorithm 353b, and an entropy-based algorithm 353c. However, the present disclosure is not limited thereto. For example, in some other embodiments, more or less algorithms may be used, different algorithms may be used, and/or any of the three algorithms may be excluded from the procedure. In other words, the three algorithms depicted in FIG. 3 are only shown for the purpose of illustration, rather than limitation. The three algorithms will be explained in detail below with reference to FIG. 4-FIG. 9. The output of these three algorithms 353a-353c may be fed to a voting algorithm (at step 355) to determine the interactive GUI element which has the highest probability to drive the malware to the next step.

Figure 4:
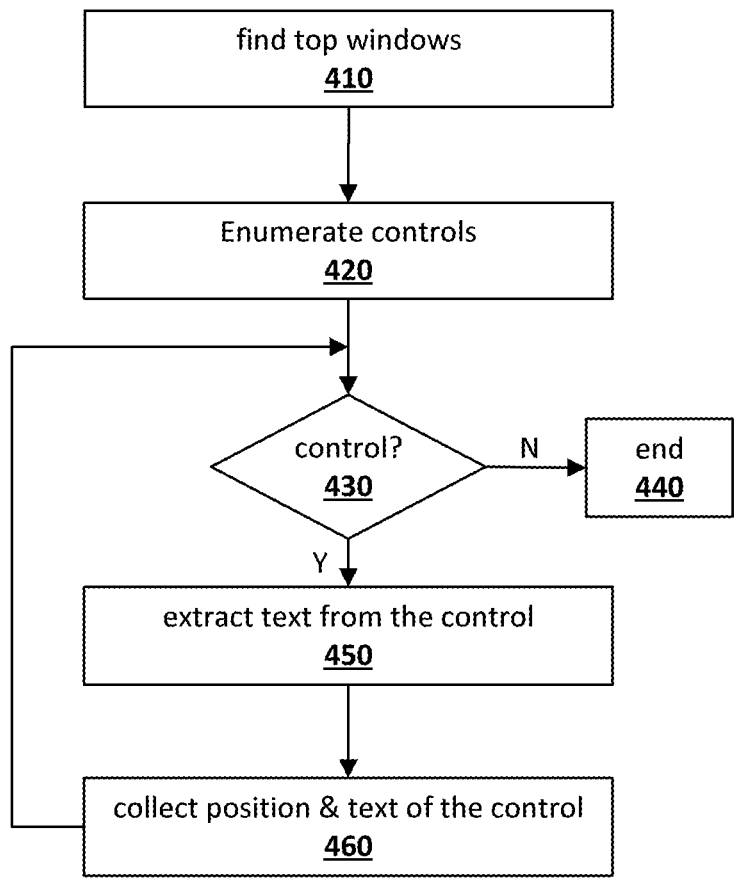
FIG. 4 is a flow chart illustrating an exemplary method of determining interactive GUI elements by using an API-based algorithm according to an embodiment of the present disclosure.
Figure 5:
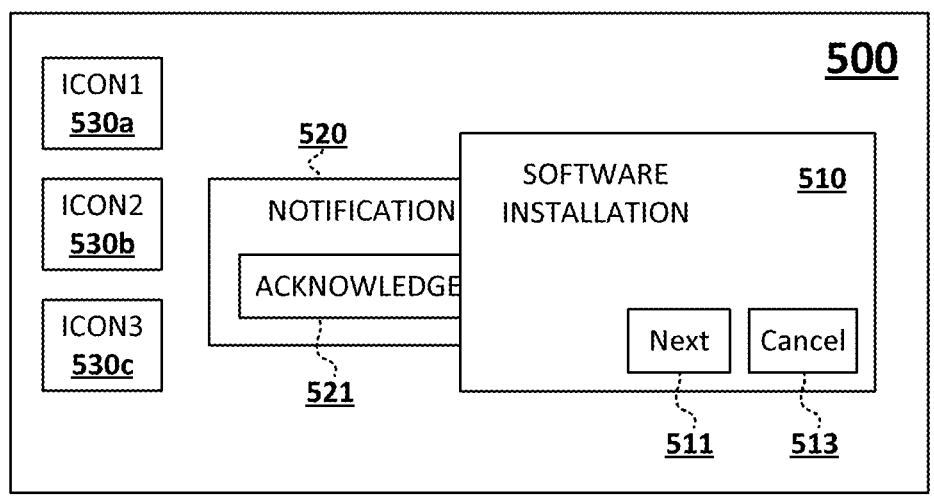
FIG. 5 is a diagram illustrating an exemplary GUI to be processed by an API-based algorithm according to an embodiment of the present disclosure.

First, the API-based algorithm 353a will be described in detail with reference to FIG. 4 and FIG. 5. FIG. 4 is a flow chart illustrating an exemplary method of determining interactive GUI elements by using an API-based algorithm according to an embodiment of the present disclosure. FIG. 5 is a diagram illustrating an exemplary GUI to be processed 500 by an API-based algorithm according to an embodiment of the present disclosure.

As shown in FIG. 5, the GUI 500 may comprise one or more windows 510 and 520 and some desktop icons 530a-530c. However, the present disclosure is not limited thereto, and the GUI 500 may comprise any number and/or any type of GUI elements. In the embodiment shown in FIG. 5, the window 510 "SOFTWARE INSTALLATION" is a window generated by the software of interest, and the window 520 "NOTIFICATION" is generated by another software application. The API-based algorithm 353a is to determine candidate interactive GUI elements in the GUI 500 by using the API provided by the OS or sandbox.

The method shown by FIG. 4 may begin with step 410 where the top window belonging to the software is determined. In certain embodiments, the software may generate multiple windows when executed. For example, if the software is an instant messenger, the instant messenger may generate multiple chat windows for multiple friends or buddies, respectively. To drive the instant messenger to the next step, a window on focus is to be determined, for example, by an API function call "GetFocus." Referring back to FIG. 5, in order to determine the top window belonging to the software of interest, an API function call (e.g. "GetFocus") may be used to determine the handle to the window that has the focus (e.g. the Window 510 as shown in FIG. 5). In some other embodiments, with regard to the determined window on focus, it is further determined whether this window belongs to the software or not, for example, by checking its parent window ID or process ID. If this window belongs to the software, then the method proceeds to step 420. However, if this window does not belong to the software, then the method or the algorithm 353a may simply return a null result or indicator, for example to the voting algorithm 355 shown in FIG. 3.

Further, in some other embodiments where this window does not belong to the software, the algorithm 353a may select one of the windows generated by the software randomly or in accordance with a predefined rule (e.g. the last generated window), as the top window, by using an API function call, such as "EnumWindows."

At step 420, the method may enumerate controls (or interactive GUI elements) in the top window, for example, by using an API function call, such as "EnumChildWindows." If it is determined at step 430 that there is no such control, then the method proceeds to step 440 where the method ends. Otherwise, the method proceeds to step 450 where the text associated with the control will be extracted from the control, for example, by one or more API function calls, such as "GetWindowTextA," "ComboBox_GetText," and/or "Button_GetText," depending on the specific type of the control.

Next, at step 460, the method may collect position & text of the control and check whether there is any more control. If there is another control in the top window, then the method loops back to step 430 and repeat from the step 430 to 460. If it is determined at step 460 that there is no more control, then the method or algorithm 353a may return a list of six element tuples, e.g. (algorithm_type, parent_window, position, text, density, entropy). In this embodiment, this format of tuple is used by all three algorithms and therefore there are fields such as "density" and "entropy" for other algorithms which will not be used by the algorithm 353a. In such a case, these two fields may be set as default values, e.g. 0. Further, in some other embodiments, the algorithm 353a may return its output in another format, e.g. (position, text) as collected in step 460 without other fields. Therefore, the format of tuple used in the present embodiment is only an example which does not limit the scope of the present disclosure.

A specific example of the tuple may be ("standard_api_method", 0x234, (100, 122, 50), "next", 0, 0). In this example, the algorithm_type field has a value of "standard_api_method", which indicates that this tuple is returned by the API-based method. Further, the parent_window field has a value of "0x234", which indicates that the control corresponding to this tuple belongs to a parent window with a Windows ID, "0x234". In this way, the subsequent steps of the method may distinguish different windows generated by the software from one another. Further, the position field has a value of "(100, 122, 50)", which indicates the position of the control on the screen or in the parent window. In other words, this position field may have an absolute coordinates or relative coordinates of the control. Further, the text field has a value of "next", which indicates that the control has a text "next" associated with or labelled on it. Further, the two fields "density" and "entropy" will be explained later when other algorithms are described. Further, the present disclosure is not limited to the above specific values.

Further, in some embodiments, the method may also select some of the detected controls, rather than select them all unconditionally. For example, as will be detailed in the algorithm 353*b*, each word or phrase may be assigned with a likelihood value to indicate how likely this word or phrase is related to an interactive GUI element that may drive the software to the next step. For example, the word "next" may be assigned with a likelihood value of 1, and the word "cancel" may be assigned with a likelihood value of "0.6." Based on the likelihood value, the method may select those detected controls which have a likelihood value greater than a predetermined threshold (e.g. 0.8).

With the method shown in FIG. 4 or the algorithm 353*a* shown in FIG. 3, some of the text information and its position information for the software which may guide the user to interact with the GUI of the software may be collected. However, considering a scenario where the text information cannot be captured via an API function call. For example, instead of displaying a button with text, a hyperlink with a picture on which text information (which cannot be acquired directly through an API function call) is displayed to the user such that the user is guided by the text information on the picture to interact with the hyperlink. In such a scenario, the API-based method is less useful.

Therefore, some other algorithms (for example, the algorithm 353*b*, "density-based algorithm," and the algorithm 353*c*, "entropy-based algorithm"), which may extract text information in such scenarios, will be described below. None of the algorithms relies on the API provided by the OS or sandbox.

Referring back to FIG. 3, before the algorithms 353*b* or 353*c* is performed, the method may convert the window into an image at step 351. For example, given a window handle, for example, a window handle determined in a way similarly to the step 410 of FIG. 4, the method may determine its window coordinate and size information, and obtain the focus of window. After that, the method may capture or acquire a rectangular area of the window as an image, for example, by printing the rectangular area into an image file. Further, this rectangular area may also be rasterized in other manners, and the present disclosure is not limited thereto. This image file will be used by the algorithms 353*b* and 353*c*.

Figure 6:
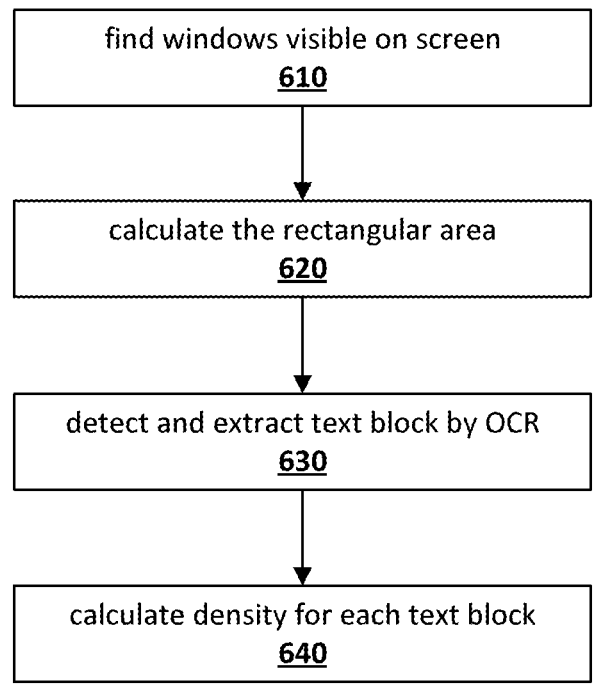
FIG. 6 is a flow chart illustrating an exemplary method of determining interactive GUI elements by using a density-based algorithm according to an embodiment of the present disclosure.
Figure 7:
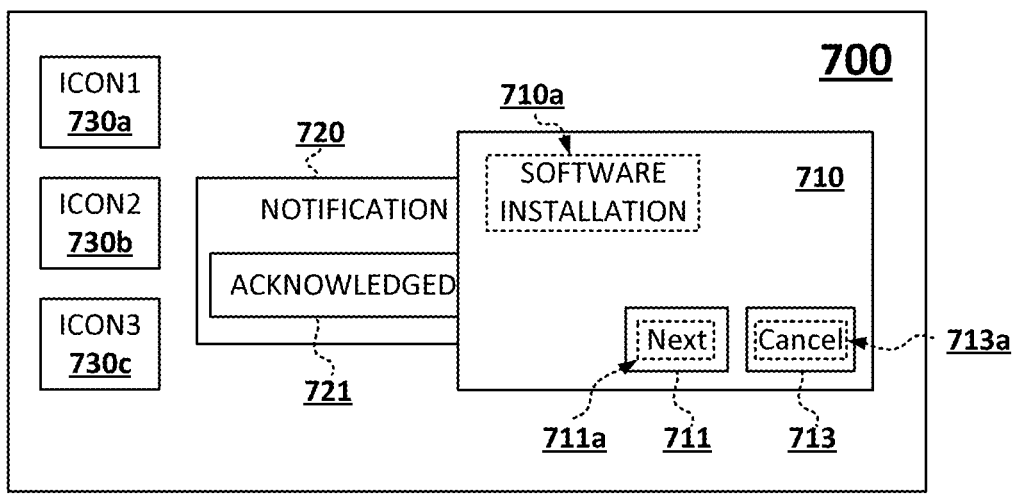
FIG. 7 is a diagram illustrating another exemplary GUI to be processed by a density-based algorithm according to an embodiment of the present disclosure.

Next, the density-based algorithm 353*b* will be described in detail with reference to FIG. 6 and FIG. 7. FIG. 6 is a flow chart illustrating an exemplary method of determining interactive GUI elements by using a density-based algorithm according to an embodiment of the present disclosure. FIG. 7 is a diagram illustrating an exemplary GUI to be processed 700 by a density-based algorithm according to an embodiment of the present disclosure.

As shown in FIG. 7, the GUI 700 may comprise one or more windows 710 and 720 and some desktop icons 730*a*-730*c*. However, the present disclosure is not limited thereto, and the GUI 700 may comprise any number and/or any type of GUI elements. In the embodiment shown in FIG. 7, the window 710 "SOFTWARE INSTALLATION" is a window generated by the software of interest, and the window 720 "NOTIFICATION" is generated by another software application. The density-based algorithm 353*b* may determine candidate interactive GUI elements in the GUI 700 based on the density of the text blocks of the image converted by the step 351 in FIG. 3.

The method shown by FIG. 6 may begin with step 610 where windows which are visible on screen (for example, a full-screen window on the top or two side-by-side windows on the top, etc.) may be found or determined, for example, by a pattern recognition method. Further, as mentioned earlier, the window may also be determined in another way, for example, similarly to the step 410 shown in FIG. 4. With reference to FIG. 7, the window 710 may be determined as the window on the top, whereas the window 720 is not selected since it is partially overlapped by the window 710, which indicates the window 720 is not on the top or have the focus.

Next, at step 620, a rectangular area of the window 710 may be calculated or determined otherwise.

At step 630, the method may detect text blocks in the image of the rectangular area of the window 710 by using an OCR method and extract text information from the text blocks. After that, at step 640, for each text block, a density is calculated based on the text extracted therefrom.

In certain embodiments, a density is the proportion of "targeted" words to all the words in the text block. For example, the text in a block may be "Notepad release setup program" which has 4 words and only "setup" is a targeted word which is more likely to be clicked by the user. Therefore, the density may be calculated as ¼=0.25. For another example, as shown in FIG. 7, the text block 711*a* may have a density of 1 since there is only one word "next" in the text block 711*a*, and the text block 710*a* may have a density of 0 since there is no targeted word, but two non-targeted words in the text block 710*a*.

In certain embodiments, a non-exhaustive set of "targeted" words may comprise: "next," "install," "update," "upgrade," "upgrade now," "next step," "get started," "start," and "run," and they may all have a likelihood value of 1. Further, another non-exhaustive set of words may comprise: "later" (with a likelihood value of 0.6), "ignore" (with a likelihood value of 0.6), and "ok" (with a likelihood value of 0.4). Please note that the likelihood values corresponding to the targeted words will be used later at step 355, and therefore the detailed description thereof will be given then.

For each of the text blocks which has a density greater than a predetermined threshold (e.g. 0.6), a six-element tuple, which may be same as the above tuple, may be returned to the method of FIG. 3 as the output of the algorithm 353*b*.

A specific example of the tuple may be ("image_text_recognition", 0×234, (100, 100, 30), "next", 0, 1). It is similar to those returned by the algorithms 353*a*, and therefore only the difference therebetween will be described in detail. In this example, the algorithm_type field has a value of "image_text_recognition", which indicates that this tuple is returned by the density-based method. Further, the text field has a value of "next," which indicates that the text block has a text "next" associated with or labelled on it. Further, the density field has a value of 1, which indicates that it is very possible the text block corresponds to a clickable button or interactive GUI element. The intuition behind this algorithm is that a block with a higher density may be more likely for user to click.

Figure 8:
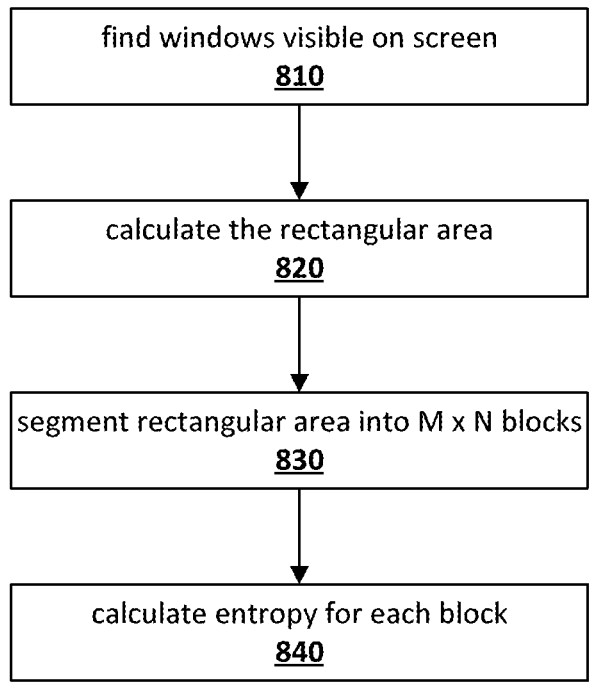
FIG. 8 is a flow chart illustrating an exemplary method of determining interactive GUI elements by using an entropy-based algorithm according to an embodiment of the present disclosure.
Figure 9:
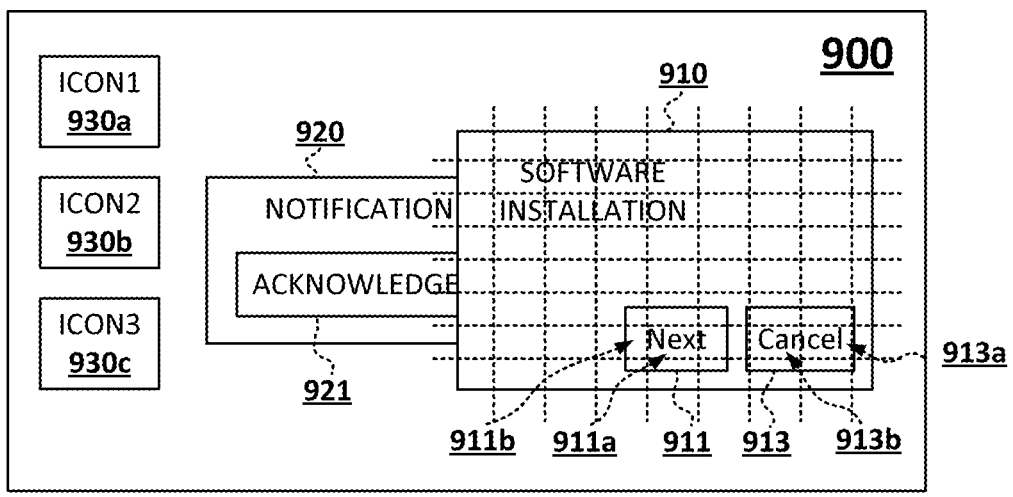
FIG. 9 is a diagram illustrating an exemplary GUI to be processed by an entropy-based algorithm according to an embodiment of the present disclosure.

Next, the entropy-based algorithm 353*c* will be described in detail with reference to FIG. 8 and FIG. 9. FIG. 8 is a flow chart illustrating an exemplary method of determining interactive GUI elements by using an entropy-based algorithm (e.g. the algorithm 353*b*) according to an embodiment of the present disclosure. FIG. 9 is a diagram illustrating another exemplary GUI to be processed 900 by an entropy-based algorithm according to an embodiment of the present disclosure.

As shown in FIG. 9, the GUI 900 may comprise one or more windows 910 and 920 and some desktop icons 930*a*-930*c*. However, the present disclosure is not limited thereto, and the GUI 900 may comprise any number and/or any type of GUI elements. In the embodiment shown in FIG. 9, the window 910 "SOFTWARE INSTALLATION" is a window generated by the software of interest, and the window 920 "NOTIFICATION" is generated by another software application. The API-based algorithm 353*b* may determine candidate interactive GUI elements in the GUI 900 based on the entropy of the portions of the image converted by the step 351 in FIG. 3.

The method shown by FIG. 8 may begin with step 810 where windows which are visible on screen (for example, a full-screen window on the top or two side-by-side windows on the top, etc.) may be found or determined, for example, by a pattern recognition method. Further, as mentioned earlier, the window may also be determined in another way, for example, similarly to the step 410 shown in FIG. 4. With reference to FIG. 9, the window 910 may be determined as the window on the top, whereas the window 920 is not selected since it is partially overlapped by the window 910, which indicates the window 920 is not on the top or have the focus.

Next, at step 820, a rectangular area of the window 910 may be calculated or determined otherwise. Based on the calculation or determination, the image of the rectangular area may be segmented into multiple blocks at step 830. For example, as shown in FIG. 9, the image of window 910 is segmented into M×N blocks, where M and N are positive integers and can be predetermined or dynamically determined based on the size of the image. In a specific embodiment, both of M and N are 10.

Next, at step 840, an entropy may be calculated for each block. In certain embodiments, an entropy may be calculated based on intensity or edge orientation of pixels in a block (which is known in the art and omitted for simplicity), and such an entropy may in general indicate how much information related to the intensity or edge orientation is contained in the block. In other words, a block with a higher entropy is more likely to contain an interactive GUI element than a block with a lower entropy. Referring to FIG. 9, the window 910 is segmented into multiple blocks and buttons 911 and 913 fall into some of the blocks, for example, 911*a*, 911*b*, 913*a*, and 913*b*, etc. Since the block 911*a* contains some of the text information of the button 911, its entropy which may be calculated based on the intensity of the pixels in the block 911*a* may be higher than other blocks, e.g. the block 911*b*. Further, in some other embodiments, since the block 911*b* contains an edge of the window 910, its entropy which may be calculated based on the edge orientation of the pixels in the block 911*b* may be higher than other blocks, e.g. the block 911*a*. That is, a block may have different entropies depending on how to calculate the entropy. In certain embodiments, an entropy may fall into a range of [0, 1]. In some other embodiments, the entropy may be greater than 1, and it can be normalized to the range of [0, 1] if needed.

For each of the blocks which has an entropy greater than a predetermined threshold (e.g. 0.8), a six-element tuple, which may be same as the above tuple, may be returned to the method of FIG. 3 as the output of the algorithm 353*c*.

A specific example of the tuple may be ("entropy_method", 0×234, (100, 122, 40), "next", 0.3, 0). It is similar to that returned by the algorithm 353*a* and the algorithm 353*b*, and therefore only the difference therebetween will be described in detail. In this example, the algorithm_type field has a value of "entropy_method", which indicates that this tuple is returned by the entropy-based method. Further, the text field has a value of "next", which indicates that the control has a text "next" associated with or labelled on it. Further, the entropy field has a value of "0.3", which indicates that the block may have some, but not too much, information related to intensity or edge orientation.

Further, the algorithm 353*c* may sort all the blocks to be returned to the method of FIG. 3 by entropy, and provide them to the method of FIG. 3 in a descending order of the entropy.

Referring back to FIG. 3, the method may proceed to step 355 after all the algorithms provide their outputs. At step 355, a voting algorithm may be used to determine which one of the outputs from the all algorithms is the interactive GUI element to be interacted by the sandbox.

An example of the voting algorithm is given below for illustration only.

---

1. Candidates = empty_list
2. For each (algorithm_type, position, text, entropy, density) tuple in list do
3.     If algorithm_type is "standard_api_method" and likelihood(text) > likelihood_threshold:
4.         Add (position, likelihood(text) + weight_value_of_algorithm1, parent_window, text) to candidates
5.     if algorithm_type is "image_text_recognition" and density(text) > density_threshold and likelihood(text) > likelihood_threshold:
6.         Add (position, likelihood(text)+weight_value_of_algorithm2, parent_window, text) to candidates
7.     if algorithm_type is "entropy_method" and entropy > entropy_threshold:
8.         Add (position, entropy + weight_value_of_algorithm3, parent_window, text) to candidates
9.     sort candidates by the likelihood

---

In the above algorithm, the "likelihood threshold" may be 0.8, the "density_threshold" may be 0.6, and the "entropy_threshold" may be 0.8. Further, in the above algorithm, the "weight_value_of algorithm 1," "weight value of algorithm2," and "weight value of algorithm3" may be 0.03, 0.02, and 0.01, respectively. However, the present disclosure is not limited thereto, and any or some or all of these values may set empirically.

According to the above voting algorithm, the method may selectively decide whether the outputs of the algorithms 353*a*/353*b*/353*c* will be considered for selection by the voting algorithm. For example, for the API-based algorithm 353*a*, only the control which has a likelihood value greater than 0.8 may be considered for selection by the voting algorithm. For another example, for the density-based algorithm 353*b*, only the text block which has a density greater than 0.6 and a likelihood value greater than 0.8 may be considered for selection by the voting algorithm. For yet another example, for the entropy-based algorithm 353*c*, only the block which has an entropy value greater than 0.8 may be considered for selection by the voting algorithm. However, the present disclosure is not limited thereto.

Further, since different algorithms may have different outputs within different value ranges, and these outputs may be adjusted before they can be compared with each other in a meaningful way. Therefore, a weight may be assigned to each algorithm's output to balance the outputs from different algorithms. However, the present disclosure is not limited thereto. In some other embodiments, the weighting may be performed in another manner than "adding a weight", for example, by multiplying a factor (weight), by a linear function, etc. Further, the candidate interactive GUI elements may be sorted by another property than the likelihood values, and the present disclosure is not limited thereto.

Once the voting algorithm determines the most promising interactive GUI element at step 355. The method may optionally check whether the determined interactive GUI element was recorded previously in a database at step 357. This step will be described below in detail with reference to FIG. 10.

If this element was not previously recorded in the database or if the step 357 is omitted (since it is optional), then the sandbox may interact with this element to drive the software to the next step, and wait to see or observe whether there is another GUI event at step 320. From there on, the method may repeat form step 320 to step 360. In such a way, a fully automatic interactive GUI element detection mechanism is possible and thus an automatic malware behavior analysis system can be established.

Further, in the above pseudocode, the choose candidates function is to aggregate the output of previous mentioned algorithms, filter out unqualified positions, and keep the top positions with high likelihood that will drive the software to run.

Further, the likelihood corresponding to the text can be built on empirical study on both goodware and malware. For example, a button with text "next" is more likely for user to click than "dismiss." Also, the text can be any language words.

Figure 10:
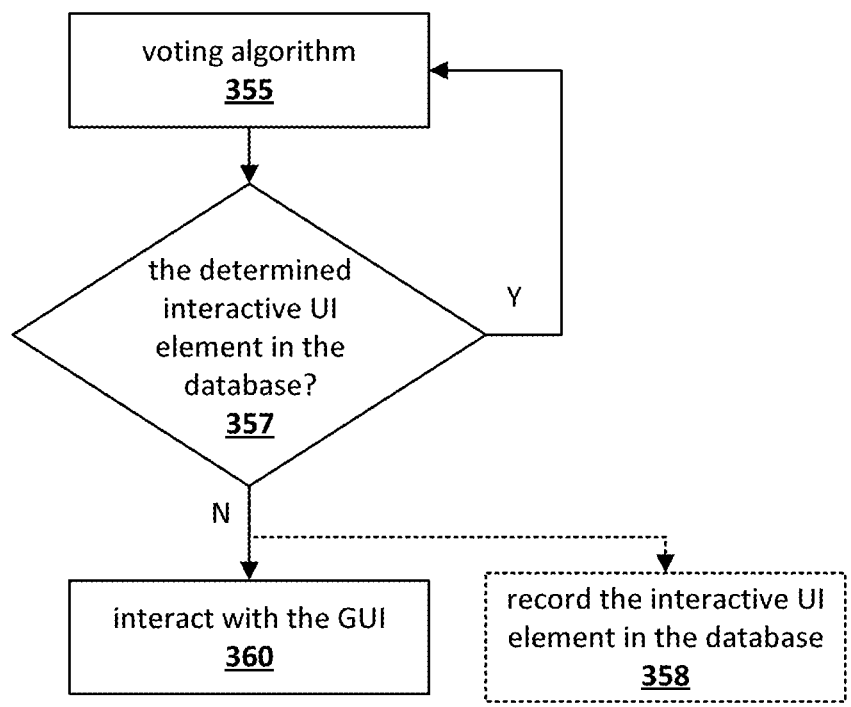
FIG. 10 is a flow chart illustrating an exemplary implementation of some steps of the method shown in FIG. 3 according to an embodiment of the present disclosure.

FIG. 10 is a flow chart illustrating an exemplary implementation of some steps of the method shown in FIG. 3 according to an embodiment of the present disclosure. As mentioned above, once the voting algorithm decides the most promising interactive GUI element, the method may check whether this element was previously recorded or not at step 257. If the answer is yes, that is, the element has a match in the database, then the method may go back to the voting algorithm 255 to check the next element in the voting list, and repeat the process until an element is found which is not recorded in the database. If all the possible element has been recorded in the database, the method may go directly to end 330 (in FIG. 3) to end the whole process. As shown in FIG. 10, a specific method to check whether this element was previously recorded or not is to compare it to entries in a database which stores the history information for the previously interacted interactive GUI elements. A simple algorithm is provided below for illustration only.

```
1. For each pos in position_list do
2.    w = get_window_from(pos)
3.    info = get_window_info(w) // get parent window id/title/position/size information
      if info in database:
4.        record = database[info]
5.        if pos in record.pos_clicked_in_window: // if pos already clicked, switch to another one
6.            Continue
7.        Else
8.            Add info to database
9.            simulate mouse to click position // an example of interacting with the GUI element
10.           If the state of w is changed:
11.               add pos to info.pos_clicked_in_window
12.               break
```

The drive window function takes the input of the top positions, get the windows where the position falls into, and simulate mouse to click the position. If the window state changes, e.g. window is active/enabled/visible and so on, sandbox keeps monitoring the malware behaviors.

Further, based on the above pseudocode, it is clear that the position information is used as an index or primary key for the data in the database. However, the present disclosure is not limited thereto.

In addition, as also shown in FIG. 10, if the most promising interactive GUI element was not previously recorded in the database, then it may be added to the database at step 358 for subsequent procedures. In certain embodiments, the step 358 may be performed in parallel to or before or after the step 360 of FIG. 3, and the present disclosure is not limited thereto.

In general, the database may be used to track which window was visited previously and/or its change of state. It helps to eliminate repeated navigating to the same window to some extent. In certain embodiments, each record/entry in the database can uniquely identify the current window. For example, the record may have the following information:

Parent window id; e.g. 0×234
Current window title; e.g. "notepad setup"
Current window coordinates (x, y); e.g. (125, 195)
Current window size (height×width); e.g. (500×500)
Positions in window that is clicked; e.g. two positions in list [(100, 100), (120, 130)]

The above proposed solution aims at combating with sophisticated malware that uses GUI interface to evade sandbox detection. If a sandbox cannot find the right position to drive the malware to the next step, no dynamic behaviors can be observed from malware. Advanced anti-malware detection methods (e.g. behavior based) requires more behaviors data from both malware and goodware. Therefore, the above proposed methods can provide rich behavior data when malware/goodware has GUI involved.

In summary, the above proposed solution according to some embodiments of the present application leverages standard API methods and heuristic methods (e.g. image recognition (entropy-based) and OCR-based techniques) to identify the positions in GUI interface which will lead malware to run to the next step.

Figure 11:
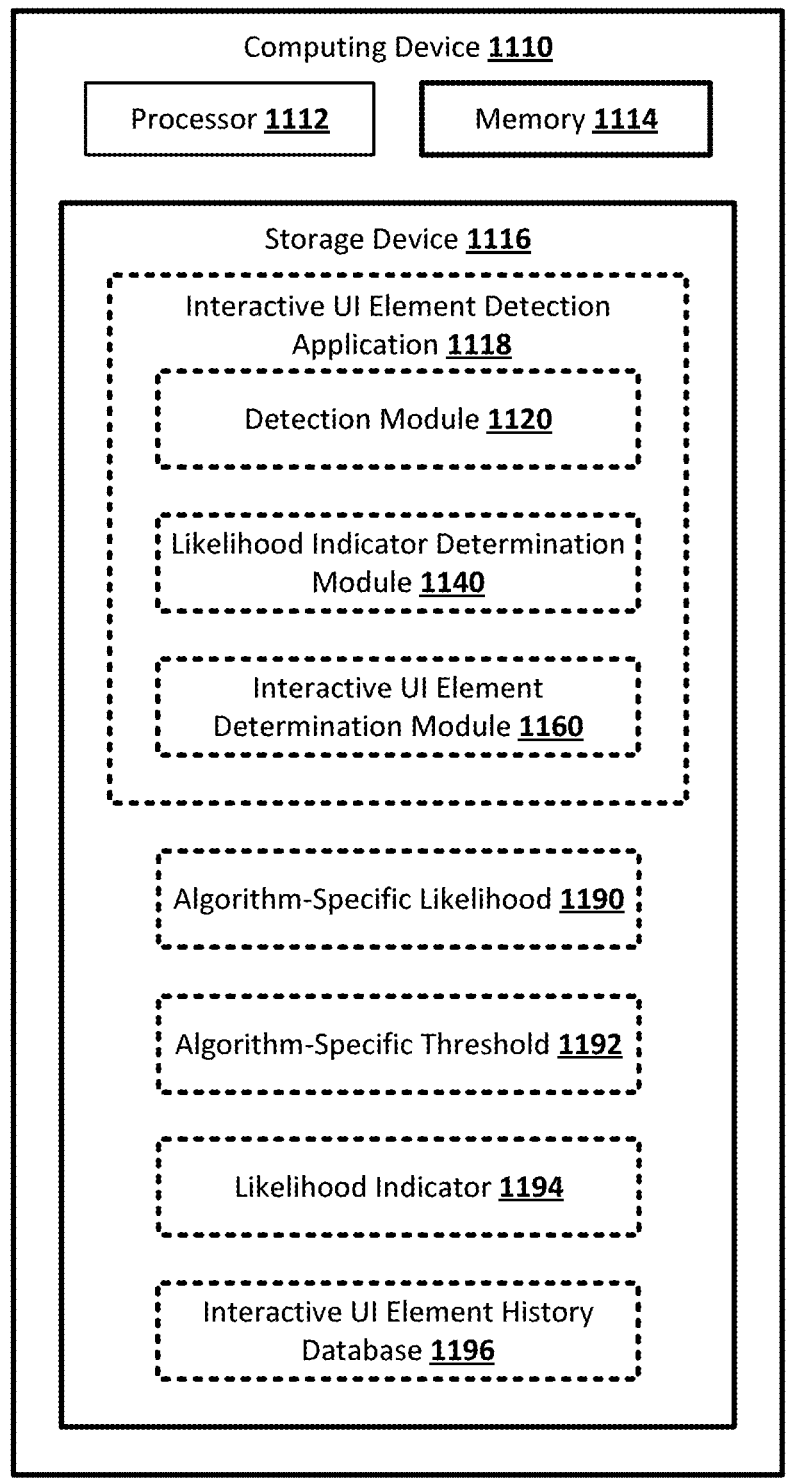
FIG. 11 is a block diagram illustrating an exemplary arrangement which may be used in an electronic device according to an embodiment of the present disclosure.

FIG. 11 is a block diagram illustrating an exemplary arrangement which may be used in an electronic device according to an embodiment of the present disclosure.

As shown in FIG. 11, electronic device or the computing device 1110 may be a server computer, a cluster, a cloud computer, a general-purpose computer, a mobile device, a tablet, or a specialized computer, which may detect one or more candidate interactive GUI elements in a GUI based on a plurality of algorithms; determine a likelihood indicator for each of the one or more candidate interactive GUI elements, a likelihood indicator indicating the likelihood that a candidate interactive GUI element associated with the likelihood indicator is an interactive GUI element to be interacted; and determine an interactive GUI element to be interacted from the one or more candidate interactive GUI elements based on the likelihood indicators.

In certain embodiments, the computing device 1110 may communicate with other computing devices or services, so as to obtain necessary data from those computing devices to perform the above described method and provide the result to those computing devices. In certain embodiments, the communication may be performed via a network, which may be a wired or wireless network, and may be of various forms, such as a public network and/or a private network.

As shown in FIG. 11, the computing device 1110 may include, without being limited to, a processor 1112, a memory 1114, and an optional storage device 1116. In certain embodiments, the computing device 1110 may include other hardware components and/or software components (not shown) to perform its corresponding tasks. Examples of these hardware and/or software components may include, but not limited to, other required memory, interfaces, buses, Input/output (I/O) modules or devices, network interfaces, and/or peripheral devices.

The processor 1112 may be a central processing unit (CPU) which is configured to control operation of the computing device 1110. The processor 1112 can execute an operating system (OS) or other applications of the computing device 1110. In certain embodiments, the computing device 1110 may have more than one CPU as the processor, such as two CPUs, four CPUs, eight CPUs, or any suitable number of CPUs.

The memory 1114 may be a volatile memory, such as the random-access memory (RAM), for storing the data and/or information during the operation of the computing device 1110. In certain embodiments, the memory 1114 may be a volatile memory array. In certain embodiments, the computing device 1110 may run on more than one memory 1114. The optional storage device 1116 may be a non-volatile data storage media for storing the OS (not shown) and other applications of the computing device 1110. Examples of the storage device 1116 may include non-volatile memory such as flash memory, memory cards, USB drives, hard drives, floppy disks, optical drives, solid-state drive (SSD) or any other types of data storage devices. In certain embodiments, the storage device 1116 may be a local storage, a remote storage, or a cloud storage. In certain embodiments, the computing device 1110 may have multiple storage devices 1116, which may be identical storage devices or different types of storage devices, and the applications of the computing device 1110 may be stored in one or more of the storage devices 1116 of the computing device 1110. In certain embodiments, the computing device 1110 is a cloud computer, and the processor 1112, the memory 1114 and the storage device 1116 are shared resources provided over the Internet on-demand.

As shown in FIG. 11, the storage device 1116 may include an interactive GUI element detection application 1118, and algorithm-specific likelihood data 1190, algorithm-specific threshold 1192, algorithm-specific weights (not shown), likelihood indicator data 1194, and interactive GUI element history database 1196. The interactive GUI element detection application 1118 may be configured to detect an interactive GUI element to be interacted by a sandbox or a computer.

The interactive GUI element detection application 1118 may include, among other things, a detection module 1120, a likelihood indicator determination module 1140, and an interactive GUI element determination module 1160. In certain embodiments, the interactive GUI element detection application 1118 may include other applications or modules necessary for the operation of the interactive GUI element detection application 1118. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the interactive GUI element detection application 1118 may be located at a remote computing device or distributed in a cloud.

In certain embodiments, the detection module 1120 may be configured to detect one or more candidate interactive GUI elements in a GUI based on a plurality of algorithms. For example, as shown by steps 353*a*-353*c* of FIG. 3, multiple algorithms are used to determine candidate interactive GUI elements.

In certain embodiments, the likelihood indicator determination module 1140 may be configured to determine a likelihood indicator for each of the one or more candidate interactive GUI elements, wherein a likelihood indicator may indicate the likelihood that a candidate interactive GUI element associated with the likelihood indicator is an interactive GUI element to be interacted. For example, as shown by step 355 and its description, a likelihood value or indicator is calculated or assigned for each candidate interactive GUI element. To be more specific, for the API-based algorithm, the likelihood indicator for a control or a candidate interactive GUI element may be determined based on the likelihood of its text information and the algorithm-specific weight. For the entropy-based algorithm, the likelihood indicator for a block or a candidate interactive GUI element may be determined based on the entropy of the block and the algorithm-specific weight. For the density-based algorithm, the likelihood indicator for a text block or a candidate interactive GUI element may be determined based on the likelihood of the text block and the algorithm-specific weight.

In certain embodiments, the interactive GUI element determination module 1160 may be configured to determine an interactive GUI element to be interacted from the one or more candidate interactive GUI elements based on the likelihood indicators. For example, as shown by step 355 and its description, a candidate interactive GUI element which has the highest likelihood may be determined as the interactive GUI element to be interacted.

As mentioned earlier, these modules can be implemented as instructions or code to be executed on the processor 1112, and therefore the above modules may be described in another manner. For example, the memory 1114 may store instructions which, when executed by the processor 1112, cause the processor 1112 to: detect one or more candidate interactive GUI elements in the GUI based on a plurality of algorithms; determine a likelihood indicator for each of the one or more candidate interactive GUI elements, a likelihood indicator indicating the likelihood that a candidate interactive GUI element associated with the likelihood indicator is an interactive GUI element to be interacted; and determine an interactive GUI element to be interacted from the one or more candidate interactive GUI elements based on the likelihood indicators.

In certain embodiments, the plurality of algorithms may comprise at least one of: an Application Programming Interface (API) based algorithm, an Optical Character Recognition (OCR) based algorithm, and an entropy based algorithm. In certain embodiments, the memory 1114 may store instructions which, when executed by the processor 1112, further cause the processor 1112 to extract text from each of one or more interactive GUI elements in the GUI by using an API for the GUI; determine a first algorithm-specific likelihood for each of the one or more interactive GUI elements based on the extracted text; and determine, for each interactive GUI element for which the calculated first algorithm-specific likelihood is greater than a first algorithm-specific threshold, the interactive GUI element as a candidate interactive GUI element.

In certain embodiments, the memory 1114 may store instructions which, when executed by the processor 1112, further cause the processor 1112 to compare the extracted text with one or more pieces of text in a predefined set of text; and determine a likelihood corresponding to a piece of text in the predefined set of text as the first algorithm-specific likelihood for the corresponding interactive GUI element, in response to the result of the comparison indicating that the extracted text is matched with the piece of text. In certain embodiments, the memory 1114 may store instructions which, when executed by the processor 1112, further cause the processor 1112 to determine the likelihood indicator by weighting the first algorithm-specific likelihood with a first algorithm-specific weight.

In certain embodiments, the memory 1114 may store instructions which, when executed by the processor 1112, further cause the processor 1112 to obtain a GUI image corresponding to the GUI; segment the GUI image into a plurality of blocks; determine an entropy for each of the plurality of blocks by using the entropy based algorithm; and determine, for each block for which the entropy is greater than a second algorithm-specific threshold, an interactive GUI element with which the block is associated as a candidate interactive GUI element. In certain embodiments, the memory 1114 may store instructions which, when executed by the processor 1112, further cause the processor 1112 to determine an entropy value for each of the plurality blocks based on intensities and/or edge orientations for pixels in the corresponding block in the GUI image. In certain embodiments, the memory 1114 may store instructions which, when executed by the processor 1112, further cause the processor 1112 to determine the likelihood indicator by weighting the entropy with a second algorithm-specific weight.

In certain embodiments, the memory 1114 may store instructions which, when executed by the processor 1112, further cause the processor 1112 to detect one or more text blocks in the GUI by using the OCR-based algorithm; calculate, for each of the one or more text blocks, a density and/or a third algorithm-specific likelihood based on the text in the corresponding text block; and determine, for each text block for which the density is greater than a third algorithm-specific threshold and/or the third algorithm-specific likelihood is greater than a first algorithm-specific threshold, an interactive GUI element with which the block is associated as a candidate interactive GUI element. In certain embodiments, the memory 1114 may store instructions which, when executed by the processor 1112, further cause the processor 1112 to determine the number of targeted words and the number of all words in the text in the corresponding text block; and calculate the density by dividing the number of all words by the number of targeted words.

In certain embodiments, the memory 1114 may store instructions which, when executed by the processor 1112, further cause the processor 1112 to determine the likelihood indicator by weighting the third algorithm-specific likelihood with a third algorithm-specific weight. In certain embodiments, the memory 1114 may store instructions which, when executed by the processor 1112, further cause the processor 1112 to sort the one or more candidate interactive GUI elements by their likelihood indicators; and determine candidate interactive GUI element with the highest likelihood indicator as the interactive GUI element to be interacted.

In certain embodiments, the memory 1114 may store instructions which, when executed by the processor 1112, further cause the processor 1112 to compare information related to the determined interactive GUI element to be interacted with history information previously stored in a database. In certain embodiments, the memory 1114 may store instructions which, when executed by the processor 1112, further cause the processor 1112 to interact with the determined interactive GUI element to be interacted by simulating a user operation corresponding to the type of the interactive GUI element to be interacted, in response to determining that the information related to the determined interactive GUI element to be interacted being not matched with the history information previously stored in a database. In certain embodiments, the memory 1114 may store instructions which, when executed by the processor 1112, further cause the processor 1112 to determine whether the state of the GUI is changed after the interaction; and record information related to the determined interactive GUI element in a database as history information in response to determining that the state of the GUI is changed after the interaction.

In certain embodiments, the memory 1114 may store instructions which, when executed by the processor 1112, further cause the processor 1112 to determine another interactive GUI element to be interacted from the one or more candidate interactive GUI elements based on the likelihood indicators, in response to determining that the information related to the determined interactive GUI element to be interacted being matched with the history information previously stored in a database. In certain embodiments, the information related to the determined interactive GUI element to be interacted comprises at least one of: the identifier of the GUI; the title of the determined interactive GUI element to be interacted; the position of the determined interactive GUI element to be interacted; the size of the determined interactive GUI element to be interacted; and the position where the interaction is to be occurred. In certain embodiments, the application corresponding to the GUI is executed in a sandbox.

In summary, certain embodiments of the present disclosure provides a solution for automatically detecting an interactive GUI element to be interacted. Further, a corresponding device and a non-transitory computer readable storage medium are also provided.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

We claim:

1. A computer-implemented method of automatically determining an interactive GUI element in a graphic user interface (GUI) to be interacted, the method comprising:

detecting, by a processor, one or more candidate interactive GUI elements in the GUI based on a plurality of algorithms, wherein the plurality of algorithms comprises at least two of:
an Application Programming Interface (API) based algorithm;
an entropy based algorithm; and
an Optical Character Recognition (OCR) based algorithm;

determining, by the processor, a likelihood indicator for each of the one or more candidate interactive GUI elements the likelihood indicator indicating a likelihood that the candidate interactive GUI element associated with the likelihood indicator is the interactive GUI element to be interacted; and determining, by the processor, the interactive GUI element to be interacted from the one or more candidate interactive GUI elements based on the likelihood indicators;
wherein the step of detecting, by the processor, one or more candidate interactive GUI elements in the GUI based on a plurality of algorithms comprises:
extracting, by the processor, text from each of one or more interactive GUI elements in the GUI by using an API for the GUI;
determining, by the processor, a first algorithm-specific likelihood for each of the one or more interactive GUI elements based on the extracted text; and
determining, by the processor, for each interactive GUI element for which the calculated first algorithm-specific likelihood is greater than a first algorithm-specific threshold, the interactive GUI element as a candidate interactive GUI element;
wherein the step of determining, by the processor, a likelihood indicator for each of the one or more candidate interactive GUI elements comprises:
determining, by the processor, the likelihood indicator by weighting the first algorithm-specific likelihood with a first algorithm-specific weight.

2. The method of claim 1, wherein the step of determining, by the processor, a first algorithm-specific likelihood for each of the one or more interactive GUI elements based on the extracted text comprises:
comparing, by the processor, the extracted text with one or more pieces of text in a predefined set of text; and
determining, by the processor, a likelihood corresponding to a piece of text in the predefined set of text as the first algorithm-specific likelihood for the corresponding interactive GUI element, in response to the result of the comparison indicating that the extracted text is matched with the piece of text.

3. The method of claim 1, wherein the step of detecting, by the processor, one or more candidate interactive GUI elements in the GUI based on a plurality of algorithms further comprises:
detecting, by the processor, one or more text blocks in the GUI by using the OCR-based algorithm;
calculating, by the processor, for each of the one or more text blocks, a density and/or a second algorithm-specific likelihood based on the text in the corresponding text block; and
determining, by the processor, for each text block for which the density is greater than a second algorithm-specific threshold and/or the second algorithm-specific likelihood is greater than a first algorithm-specific threshold, an interactive GUI element with which the block is associated as a candidate interactive GUI element.

4. The method of claim 3, wherein the step of calculating, by the processor, for each of the one or more text blocks, a density based on the text in the corresponding text block comprises:
determining, by the processor, the number of targeted words and the number of all words in the text in the corresponding text block; and
calculating, by the processor, the density by dividing the number of all words by the number of targeted words.

5. The method of claim 3, wherein the step of determining, by the processor, a likelihood indicator for each of the one or more candidate interactive GUI elements further comprises:
determining, by the processor, the likelihood indicator by weighting the second algorithm-specific likelihood with a second algorithm-specific weight.

6. The method of claim 1, wherein the step of detecting, by the processor, one or more candidate interactive GUI elements in the GUI based on a plurality of algorithms further comprises:
obtaining, by the processor, a GUI image corresponding to the GUI;
segmenting, by the processor, the GUI image into a plurality of blocks;
determining, by the processor, an entropy for each of the plurality of blocks by using the entropy based algorithm; and
determining, by the processor, for each block for which the entropy is greater than a third algorithm-specific threshold, an interactive GUI element with which the block is associated as a candidate interactive GUI element.

7. The method of claim 6, wherein the step of determining, by the processor, an entropy for each of the plurality of blocks by using the entropy based algorithm comprises:
determining, by the processor, an entropy value for each of the plurality blocks based on intensities and/or edge orientations for pixels in the corresponding block in the GUI image.

8. The method of claim 6, wherein the step of determining, by the processor, a likelihood indicator for each of the one or more candidate interactive GUI elements further comprises:
determining, by the processor, the likelihood indicator by weighting the entropy with a third algorithm-specific weight.

9. The method of claim 1, wherein the step of determining, by the processor, the interactive GUI element to be interacted from the one or more candidate interactive GUI elements based on the likelihood indicators comprises:
sorting, by the processor, the one or more candidate interactive GUI elements by their likelihood indicators; and
determining, by the processor, candidate interactive GUI element with the highest likelihood indicator as the interactive GUI element to be interacted.

10. The method of claim 1, further comprising:
comparing, by the processor, information related to the determined interactive GUI element to be interacted with history information previously stored in a database.

11. The method of claim 10, further comprising:
interacting, by the processor, with the determined interactive GUI element to be interacted by simulating a user operation corresponding to the type of the interactive GUI element to be interacted, in response to determining that the information related to the determined interactive GUI element to be interacted being not matched with the history information previously stored in a database.

12. The method of claim 11, further comprising:
determining, by the processor, whether the state of the GUI is changed after the interaction; and
recording, by the processor, information related to the determined interactive GUI element in a database as history information in response to determining that the state of the GUI is changed after the interaction.

13. The method of claim 10, further comprising:
determining, by the processor, another interactive GUI element to be interacted from the one or more candidate interactive GUI elements based on the likelihood indicators, in response to determining that the information related to the determined interactive GUI element to be interacted being matched with the history information previously stored in a database.

14. The method of claim 10, wherein the information related to the determined interactive GUI element to be interacted comprises at least one of:
the identifier of the GUI;
the title of the determined interactive GUI element to be interacted;
the position of the determined interactive GUI element to be interacted;
the size of the determined interactive GUI element to be interacted; and
the position where the interaction is to be occurred.

15. The method of claim 1, wherein the application corresponding to the GUI is executed in a sandbox.

16. A device comprising
a processor;
a memory storing instructions which, when executed by the processor, cause the processor to:
detect one or more candidate interactive GUI elements in the GUI based on a plurality of algorithms, wherein the plurality of algorithms comprises at least two of:
an Application Programming Interface (API) based algorithm;
an entropy based algorithm; and
an Optical Character Recognition (OCR) based algorithm;
determine a likelihood indicator for each of the one or more candidate interactive GUI elements, a likelihood indicator indicating the likelihood that a candidate interactive GUI element associated with the likelihood indicator is an interactive GUI element to be interacted; and
determine the interactive GUI element to be interacted from the one or more candidate interactive GUI elements based on the likelihood indicators;
wherein the processor is further configured to:
extract text from each of one or more interactive GUI elements in the GUI by using an API for the GUI;
determine a first algorithm-specific likelihood for each of the one or more interactive GUI elements based on the extracted text; and
determine for each interactive GUI element for which the calculated first algorithm-specific likelihood is greater than a first algorithm-specific threshold, the interactive GUI element as a candidate interactive GUI element;
wherein the processor is further configured to:
determine the likelihood indicator by weighting the first algorithm-specific likelihood with a first algorithm-specific weight.

17. A non-transitory computer-readable storage medium storing instructions which, when executed by a processor, cause the processor to perform the method of claim 1.

* * * * *